J. WALSH.
WEEDER AND CULTIVATOR.
APPLICATION FILED DEC. 6, 1920.
1,413,509.
Patented Apr. 18, 1922.
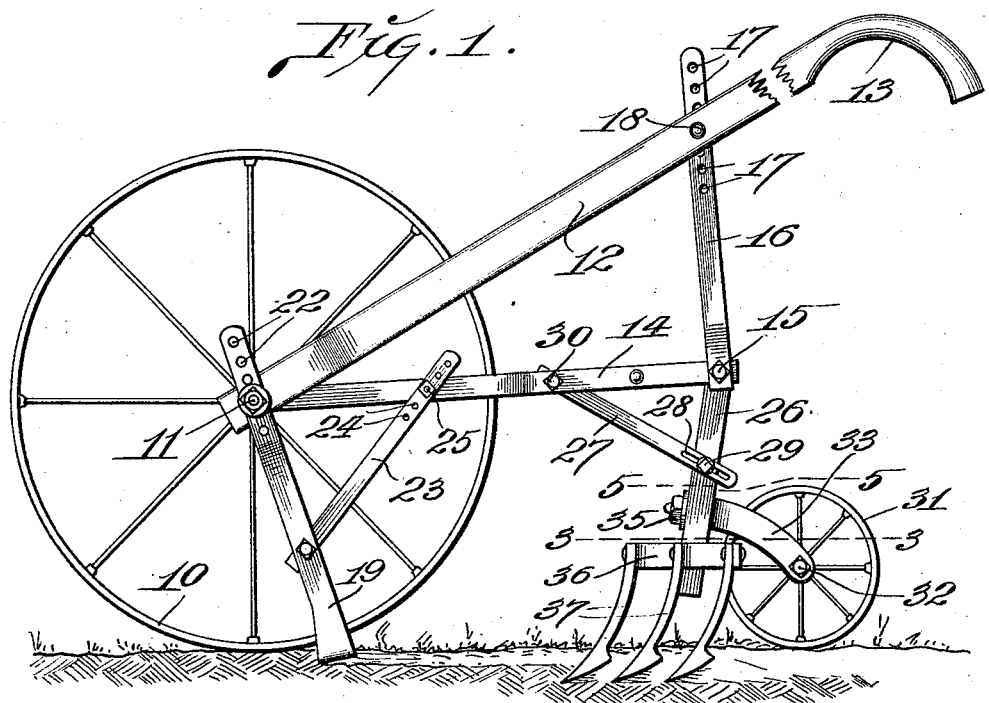
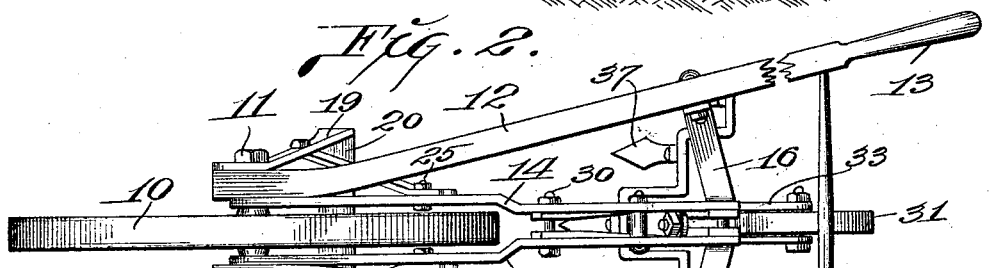
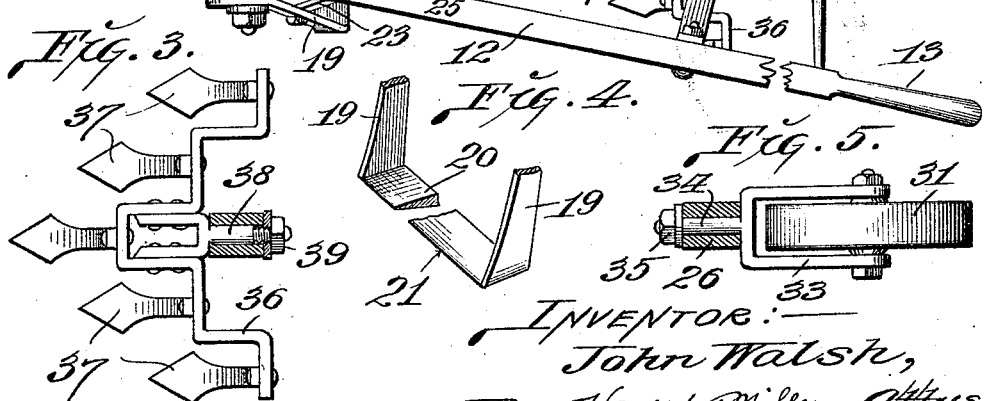
INVENTOR:—
John Walsh,
By Hazard Miller Attys.

UNITED STATES PATENT OFFICE.

JOHN WALSH, OF GARDENA, CALIFORNIA.

WEEDER AND CULTIVATOR.

1,413,509.   Specification of Letters Patent.   Patented Apr. 18, 1922.

Application filed December 6, 1920. Serial No. 428,682.

*To all whom it may concern:*

Be it known that I, JOHN WALSH, a citizen of the United States, residing at Gardena, in the county of Los Angeles and State of California, have invented new and useful Improvements in Weeders and Cultivators, of which the following is a specification.

My invention relates generally to agricultural implements, and more particularly to a relatively small, light weight implement that is adapted to be manually pushed forwardly over the ground, and which implement is equipped with a weed cutter and with a series of relatively small cultivating shovels.

The principal objects of my invention are to provide a relatively strong and durable implement that is wheel supported so that it may be readily pushed forwardly over the ground, to equip the implement with a weed cutter and with cultivating shovels that have a wide range of adjustment, and further, to provide an implement that will be very effective in performing its intended functions.

With the foregoing and other objects in view, my invention consists in certain new and novel features of construction and arrangement of parts hereinafter more fully described and claimed and illustrated in the accompanying drawing, in which:

Fig. 1 is a side elevational view of a combined cultivator and weed cutter of my improved construction.

Fig. 2 is a plan view of the implement.

Fig. 3 is an enlarged horizontal section taken approximately on the line 3—3 of Fig. 1.

Fig. 4 is a perspective of the lower portion of the weed cutter that forms a part of my invention.

Fig. 5 is an enlarged horizontal section taken approximately on the line 5—5 of Fig. 1.

Referring by numerals to the accompanying drawing, which illustrates a practical embodiment of my invention, 10 designates the main supporting wheel for the implement, said wheel being journaled upon a transversely disposed bolt 11 that is seated in the forward ends of a pair of inclined and diverging beams 12, and the rear ends of which terminate in handles 13.

Loosely arranged on the bolt 11, and positioned between said wheel 10 and the forward ends of the beams 12, are the forward ends of a pair of rearwardly projecting parallel bars 14, and passing through the rear ends thereof is a transversely disposed bolt 15. This bolt 15 also passes through the lower ends of a pair of upright bars 16 and the upper portions of which are provided with rows of perforations such as 17, in order that said bars may be adjustably secured to the beams 12, by bolts 18, and which latter pass through said beams and through certain of the apertures in said bars.

The weed cutter forming a part of my improved implement, comprises a pair of upright arms 19, the lower ends of which are connected by a blade 20 having a sharp front edge 21 and the upper portions of said arms 19 are provided with perforations such as 22 in order that the weed cutter may be adjustably arranged on the bolt 11 at the forward ends of beams 12.

Pivotally connected to the lower portion of each arm 19 is the lower end of an upwardly and rearwardly projecting brace 23, the upper portion thereof being provided with perforations such as 24, whereby it may be adjustably secured by means of a bolt 25 to the corresponding one of the bars 14.

The upper ends of a pair of substantially upright bars 26 are mounted on bolt 15 between the rear ends of bars 14, and the lower ends of said bars 26 are connected to each other in any suitable manner, either by an integrally formed cross member or by a transversely arranged bolt.

The lower rear portions of braces 27 are provided with slots such as 28 and passing therethrough and through the bars 26 is a bolt 29, such construction permitting the bars 26 to be adjusted for a limited distance in a forward and rearward direction relative to a vertical plane. The forward ends of these braces 27 are connected in any suitable manner, preferably by a bolt 30 to the intermediate portions of bars 14.

The rear portion of the implement is supported by a relatively small trailing wheel 31, the same being journaled on a bolt 32 that passes through the rear lower portions of the arms of a fork 33. Projecting forwardly from the forward end of this fork is a pin 34 that passes between the vertical bars 26, and the forward end of said pin is threaded to receive a nut 35, and which latter, when tightened, locks the wheel carrying fork 33 in its vertically adjusted position upon said bars 26.

Depending from a horizontally disposed frame 36 are relatively small cultivator shovels 37, the same being suitably spaced apart, and projecting rearwardly from the central portion of said frame is a pin 38 that passes between the lower portions of bars 26 and the rear end of said pin being threaded in order to receive a nut 39, which latter, when tightened, effectively locks the shovel carrying frame in its vertically adjusted position upon the bars 26.

An implement thus constructed is relatively light in weight, and at the same time is very strong and durable. It can be pushed forwardly over the ground with comparatively little effort and the wide range of adjustment of its various parts enables it to be advantageously used wherever it is desired to lightly cultivate the soil.

The apertures 22 in the upper portions of the arms 19 enable the weed cutter to be adjusted vertically so as to operate above or below the surface of the ground and the apertures 24 in the braces 23 permits the weed cutter to be adjusted to the desired angle relative to a vertical plane.

The wheel carrying yoke 33 and the cultivator shovel carrying frame 36 may be independently adjusted vertically upon the bars 26, and said bars and the parts carried thereby, are capable of vertical adjustment through the medium of the bolts 18 and the apertures 17.

Obviously, minor changes in the size, form and construction of the various parts of my improved cultivator and weed cutter may be made and substituted for those herein shown and described without departing from the spirit of my invention, the scope of which is set forth in the appended claims.

I claim as my invention:

1. In a cultivator, a pair of handle bars, a wheel journaled in the forward ends thereof, a frame pivotally connected to the forward ends of the handle bars and adjustably supported from the rear ends thereof, a vertically slotted and angularly adjustable frame depending from the rear portion of the first mentioned frame, the shank of a trailing wheel fork being vertically adjustably supported by the slotted frame, a trailing wheel journaled in the fork, and a cultivator shovel carrying frame being vertically and pivotally adjustably supported by the slotted frame.

2. A weeder and cultivator having a main traction wheel, handle bars, frame, and cultivator shovel carrying frame, said shovel frame comprising a horizontally disposed bar having substantially rearwardly extending L-shaped portions symmetrically arranged, fastening means, one end of which is secured to the central portion of said bar and the other end secured to the first mentioned frame, and the cultivator shovels being fastened to the transverse portions of said bar.

In testimony whereof I have signed my name to this specification.

JOHN WALSH.